United States Patent [19]

Hattori et al.

[11] Patent Number: 5,681,673
[45] Date of Patent: Oct. 28, 1997

[54] ALKALINE SECONDARY BATTERY

[75] Inventors: Yohei Hattori, Moriguchi; Nobuyasu Morishita, Fujiidera; Hiroki Takeshima, Fujisawa; Hideo Kaiya, Chigasaki; Munehisa Ikoma, Nara-ken, all of Japan

[73] Assignee: Matsushita Electric Industrial Co., Ltd., Osaka, Japan

[21] Appl. No.: 571,173

[22] Filed: Dec. 12, 1995

[30] Foreign Application Priority Data

Jul. 31, 1995  [JP]  Japan .................... 7-194561

[51] Int. Cl.$^6$ .................... H01M 4/80
[52] U.S. Cl. .................... 429/235; 429/223; 429/241
[58] Field of Search .................... 429/218, 223, 429/233, 235, 236, 241, 242, 245

[56] References Cited

U.S. PATENT DOCUMENTS

| | | |
|---|---|---|
| 3,325,280 | 6/1967 | Horn et al. . |
| 3,751,300 | 8/1973 | Yamamoto et al. . |
| 4,000,004 | 12/1976 | Takahashi et al. ............ 429/10 |
| 4,236,927 | 12/1980 | Bühl et al. . |
| 4,663,256 | 5/1987 | Corrigan ............ 429/223 |
| 5,451,475 | 9/1995 | Ohta et al. ............ 429/212 |

FOREIGN PATENT DOCUMENTS

| | | |
|---|---|---|
| 0512565A2 | 11/1992 | European Pat. Off. . |
| 0643432A1 | 3/1995 | European Pat. Off. . |
| 7-138609A | 5/1995 | Japan . |
| 7-138792A | 5/1995 | Japan . |

OTHER PUBLICATIONS

Patent Abstracts of Japan, vol. 005, No. 082 (E–059), 29 May 1981 & JP–A–56 030266 (Yuasa Battery Co Ltd) 26 Mar. 1981.

Patent Abstracts of Japan, vol. 010, No. 065 (E–388), 14 Mar. 1986 & JP–A–60 216452 (Yuasa Denchi KK) 29 Oct. 1985.

Patent Abstracts of Japan, vol. 013, No. 207 (E–758), 16 May 1989 & JP–A–01 024365 (Sanyo Electric Co Ltd) 26 Jan. 1989.

*Primary Examiner*—M. Nuzzolillo

[57] ABSTRACT

The present invention relates to an alkaline secondary battery improved in the structure of the plate substrate, and provides an alkaline secondary battery which uses a three-dimensional porous substrate which is inexpensive, improved in stability in electrolyte and inhibited from shrinkage at sintering. The battery has such a construction comprising a sealed case containing positive electrodes mainly composed of a nickel oxide, negative electrodes mainly composed of a hydrogen-absorbing alloy or a cadmium oxide, an alkaline electrolyte containing at least one component selected from the group consisting of potassium hydroxide, lithium hydroxide and sodium hydroxide and separators, the substrate used for at least one of the positive electrode and the negative electrode being a three-dimensional porous iron sintered body on the surface of which is provided a nickel coating layer.

10 Claims, 2 Drawing Sheets

ALKALINE SECONDARY BATTERY

BACKGROUND OF THE INVENTION

1. Field of the Invention

The present invention relates to an alkaline secondary battery, and, more particularly, to a structure of plate substrates for alkaline secondary batteries.

2. Description of Related Art

Hitherto, so-called sintered substrates obtained by coating a nickel-plated steel sheet such as a punching metal with a slurry of a nickel powder and an organic binder and, then, sintering the coated sheet in a reducing atmosphere have been used as plate substrates for alkaline secondary batteries. Furthermore, recently, a method for making substrates called a "pasted substrate" has rapidly spread which makes it possible to improve a filling rate of active material by enhancing the porosity of the substrates for meeting the needs to increase the capacity of batteries used for various portable devices or apparatuses or large electric sources for electric cars.

The substrates obtained by this method are called foamed metals and are produced by forming an electrically conductive layer by carbon coating, nickel electroless plating, etc. on the surface of a porous body made of a resin having a three-dimensional structure such as a foamed urethane sheet, a nonwoven fabric or the like, then forming an intermediate having a desired metal weight per unit by electrolytic nickel plating, subsequently, removing the resin component by burning, and reducing the plated metal. The method has an advantage of being able to make simple the plate making steps, because the substrate can directly be filled with an active material paste.

Alternatively, as a method for imparting electric conductivity substitutable for the above-mentioned carbon coating, it has been proposed in JP 7-138609(A) to form the electrically conductive layer by directly coating a metal powder on a support such as a foamed urethane and in JP 7-138792 (A) to form a three-dimensional porous substrate of a two-layer structure by carrying out removal of solvent and sintering after electrolytic plating. In this case, improvement of productivity can be expected since an electric power and time required for electrolytic plating at the time of making the substrates can be reduced.

When a three-dimensional porous substrate filled with an active material is used as a plate of alkaline storage batteries, nickel which is stable in an alkaline electrolyte is used as the constituting material of the substrate. However, a method for the production of the substrate by subjecting a resin support to the nickel plating is complicated in the production step, and the productivity is inferior because the plating is carried out after the step of coating the electrically conductive layer as mentioned above.

On the other hand, in a method for the production of substrates by directly coating a metal powder, forming a plating layer thereon and, then, sintering it by heat treatment, the metal powder is mainly used in a finely-divided form for improving the sinterability. In these methods, since the shrinkage of the substrate is large, namely, about 10%, a foamed urethane sheet having previously a large pore size is used, but, in this case, the size or diameter of the urethane matrix also becomes great and, further, the shrinkage is large. Thus, it is difficult to secure a stable quality of the substrate. In addition, since the sintered body has considerable fine unevenness on the surface, the substrate is readily corroded in the alkaline electrolyte to cause early increase of an internal resistance in batteries.

Furthermore, a considerably large amount of nickel is needed to secure the strength and electric conductivity necessary as plate substrates by using only nickel. However, the nickel materials are industrially expensive and there is a serious problem in the production cost. Moreover, when the surface is coated with a metal different from the metal constituting the electrically conductive layer, followed by subjecting it to sintering, these two metals form an alloy to result in increase of electric resistivity of the substrate, which leads to a large loss inside the batteries, and the product is not suitable to use as a plate substrate.

In order to solve the above problems, when a sintered substrate is made using an iron fine powder, which is industrially inexpensive material, the iron powder must be sintered at higher temperatures than in the case of using nickel to obtain sufficient strength of the resulting sintered body. This tends to further increase the shrinkage at sintering. Furthermore, when this three-dimensional porous body made of iron is used as a positive plate substrate of alkaline storage batteries, since the oxidation-reduction potential of iron is lower than that of nickel, it forms a local cell in the positive plate to cause decrease in charging efficiency or deterioration of self discharge characteristics. Moreover, iron is readily corroded in the alkaline electrolyte, resulting in passive state of the surface and the electrical conductivity decreases. As a result, it has been difficult to secure good plate characteristics over a long period of time.

SUMMARY OF THE INVENTION

The object of the present invention is to provide an alkaline secondary battery in which is used a three-dimensional porous substrate which is inexpensive, improved in stability in an alkaline electrolyte and restrained from shrinkage at the time of sintering.

DETAILED DESCRIPTION OF THE INVENTION

Figure 1:
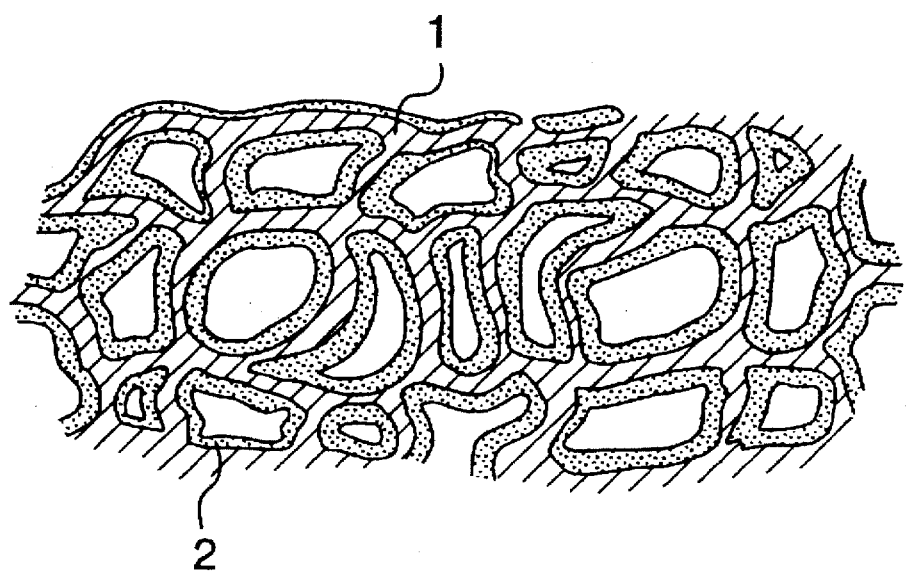
FIG. 1 is an enlarged cross-sectional view of a substrate according to one example of the present invention.

The present invention provides an alkaline secondary battery comprising a sealed case which contains a positive electrode mainly composed of a nickel oxide, a negative electrode mainly composed of a hydrogen-storing alloy or a cadmium oxide, an alkaline electrolyte containing at least one component selected from the group consisting of potassium hydroxide, lithium hydroxide and sodium hydroxide and a separator, wherein a substrate used for at least one of the positive electrode and the negative electrode comprises an iron sintered body which is a three-dimensional porous body and a nickel coating layer provided on the surface of said iron sintered body.

The positive electrode used in the present invention is mainly composed of a nickel oxide, and other components include metals such as cobalt, zinc, cadmium, etc., or an oxide or hydroxide thereof.

The characteristics of the substrate are preferably $0.5 \times 10^{-6}$–$8.0 \times 10^{-6}$ Pa in tensile strength and 1.0–10.0 mΩ in electric resistance. The capacity density of the positive electrode is preferably 500–700 mAh/cm$^3$. The amount of the electrolyte is preferably 1.3–2.8 cm$^3$ per 1 Ah of the theoretical capacity of positive electrode. The concentration of the alkali component in the alkaline electrolyte is preferably 25–40% by weight.

The sintered body is preferably prepared by coating the surface of a three-dimensional porous body made of a resin with a single powder or mixed powder of metallic iron, iron oxide and iron hydroxide and sintering the coated porous body. The powder used in this case is preferably a mixture of a powder having an average particle size of less than 15 μm and a powder having an average particle size of 15–100 μm. The content of the powder having an average particle size of less than 15 μm in the total powder is 30–80 parts by weight, and the powder having an average particle size of less than 15 μm is preferably iron oxide or iron hydroxide.

The substrate preferably has a nickel weight per unit of 250–1000 g/m$^2$, a matrix diameter of 20–100 μm and an average pore diameter of 200–600 μm, and the thickness of the nickel coated on the sintered body is preferably 1–10 μm. The "metal weight per unit" here means a weight of the coated nickel per unit area of an apparent area of the substrate after sintered. The "apparent area" means an area including no thickness factor with ignoring the pores, etc.

Furthermore, the substrate is preferably one which is heat treated under such conditions that the interface between iron and nickel is not alloyed, and the heat treatment is preferably conducted in an inert gas atmosphere.

According to the above-mentioned construction of the present invention, by coating iron with nickel, the inexpensive iron can be used as a substrate for batteries containing an alkaline electrolyte, and, furthermore, by coating nickel on the surface of iron, the coating amount of expensive nickel can be reduced. In addition, since the iron is previously made to a sintered body, the interface between the sintered body and the nickel coating layer is not alloyed, and, therefore, the electric resistance of the substrate does not increase so much and occurrence of polarization at the time of charging and discharging of the fabricated batteries can be restrained to a small extent.

The properties of the substrate having the present construction are shown below.

The breaking strength of a test piece of 10 mm in width, 100 mm in length and 1 mm in thickness under tensile condition is $0.5 \times 10^{-6}$–$8.0 \times 10^{-6}$ Pa, preferably $1.0 \times 10^{-6}$–$4.0 \times 10^{-6}$ Pa, and the electric resistivity of the test piece is 1.0–10.0 mΩ/cm, preferably 2.0–7.5 mΩ/cm. When the tensile strength is low, breaking is apt to occur during production, and from the point of the battery characteristics, electrodes made using the substrates of a low strength cannot prevent the active materials from expanding, so that the active materials fall off to result in deterioration of the life characteristics. To the contrary, in order to maintain a strength of more than $8.0 \times 10^{-6}$ Pa, the substrate must be great in matrix size and large in metal weight per unit, which brings about decrease in the capacity density of positive electrode. As for the electric resistivity, since making a substrate of lower than 1.0 mΩ/cm is accompanied with a greatly increased cross-sectional area of the substrate, the fill amount of the active material decreases and it is difficult to secure the capacity density required by the electrode.

Furthermore, in batteries fabricated using a substrate of higher than 10.0 mΩ/cm, an increased amount of polarization is made at the time of charging and discharging and the charging efficiency and output characteristics is conspicuously deteriorated. The tensile strength herein is a value at the point of time when a test piece both ends (in longitudinal direction) of which are fixed at a tensile tester breaks upon application of a load. The electric resistivity is calculated in the following manner. A direct current of 1 A is passed through the test piece in the longitudinal direction and the resistivity is calculated from the decrement in voltage at both the ends of the test piece.

The capacity density of positive electrode is in the range of 500–700 mAh/cm$^3$, preferably 550–650 mAh/cm$^3$. When the capacity density of positive electrode is smaller, the proportion of the substrate to the active material in the electrode increases. If the matrix of the substrate exposes on the surface after formation of the electrode, the current density of the portion of the substrate superior in electric conductivity increases during charging and the amount of oxygen gas generated increases and, as a result, the battery becomes hardly sealed. When the capacity density of positive electrode exceeds 700 mAh/cm$^3$, even if the substrate is filled with the active material in the corresponding amount, penetration of the electrolyte into the electrode is difficult, and the active material utilization greatly decreases and the capacity density of batteries decreases.

The alkaline electrolyte contains at least one component selected from the group consisting of potassium hydroxide, lithium hydroxide and sodium hydroxide at a concentration of 25–40 parts by weight, and sealed in the battery in a restricted amount corresponding to 1.3–2.8 cm$^3$ for 1 Ah of the theoretical capacity of the positive electrode. If the concentration is lower than 25 parts by weight, the ionic conductivity of the electrolyte decreases and the reaction resistance increases at any compositions of the electrolyte and, therefore, the output becomes conspicuously reduced. If the concentration is higher than 40 parts by weight, the substrate is considerably corroded unless the thickness of the nickel coating layer is increased. Thus, in both cases, the cycle life characteristics of the battery are deteriorated. If the amount of the electrolyte is smaller than 1.3 cm$^3$ per 1 Ah, this is not sufficient to carry out a smooth electrode reaction to cause deterioration of the charging and discharging characteristics of the battery due to the increase of reaction resistance. If it is greater than 2.8 cm$^3$, since the absorption of oxygen gas generated at overcharging is hindered, the battery becomes hardly sealed.

In order to obtain a dense and highly strong sintered body with less shrinkage, it is also necessary to control the average particle size of the powder to be sintered and improve the density. Using only the fine powder, the strength of the sintered body increases, but the shrinkage is great, and using only the powder of a large particle size, the sintered body can be densified with difficulty and the strength of the substrate lowers. Specifically, it is suitable to use a mixture comprising 30–80 parts by weight of a powder having an average particle size of smaller than 15 μm and the balance thereof having an average particle size of larger than 15 μm and 100 μm or smaller. When a mixture comprising an iron oxide powder as the powder of a smaller average particle size and a metallic iron powder as the powder of a larger average particle size is sintered, the strength of the sintered body can be further improved. That is, in producing the sintered body, first, a heat treatment is conducted in an oxidizing atmosphere to burn and remove the resin support and the binder and, in this case, binding between particles proceeds in the iron oxide powder due to diffusion between the surface of the oxide. Then, when sintering is carried out in a reducing atmosphere, the surface of the iron oxide powder is reduced to produce unstable and highly active iron and as a result, the sinterability is greatly improved, and the tensile strength of the substrate is improved.

The content of the iron oxide powder is also suitably 30–80 parts by weight, and the higher content causes great shrinking of the sintered body and the lower content results in insufficient effect of improving the sinterability referred to above. The iron oxide powder may be iron particles having oxides formed on the surface thereof by heat treatment in air or surface-oxidized iron particles produced by a water atomizing method. However, since the degree of activation at the time of reduction is higher with the content of oxygen in the iron oxide powder being increased, it is preferred to use a powder of a higher oxidation degree in an amount of 40–60 parts by weight. Thus, both the maintenance of substrate strength and the inhibition of shrinkage can be attained at the same time. Furthermore, when the average particle size of the iron oxide powder is larger than that of the iron powder, densification of the sintered body is also insufficient. The above action is also similarly seen when an iron hydroxide powder is used in place of the iron oxide powder.

The metal weight per unit on the substrate is usually 250–1000 g/m$^2$, preferably 400–600 g/m$^2$, the matrix size or diameter is usually 20–100 µm, preferably 30–60 µm, and the average pore size is 200–600 µm, preferably 300–500 µm. The range of the metal weight per unit on the substrate is indirectly determined mainly from the specified range of the tensile strength. When the average pore size exceeds 600 µm, a discharge voltage greatly decreases due to the decrease in contact area between the active material and the substrate which is an electrically conductive matrix. If the powder is of smaller than 200 µm, filling with active material paste becomes difficult for the production process and such a size cannot be practically employed.

Since the metallic porous body of the present invention is a sintered one, the surface of the substrate matrix has a relatively large amount of unevenness and is excellent for holding of the active material. When fine unevenness is present on the surface, the stability of the body in the electrolyte is feared. However, when the substrate matrix is covered with nickel and is further heat treated to remove a residual stress brought about by the plating as in the present invention, the surface unevenness is lightened. Therefore, the present invention can provide alkaline secondary batteries in which the stability of the substrate in the alkaline electrolyte is not seriously damaged as compared with porous substrates made by conventional method based on the nickel electrolytic plating, and, furthermore, which are not deteriorated in the charging efficiency and the self discharge characteristics and are excellent in life characteristics.

The nickel layer of a least 1 µm in thickness is enough to completely cover the surface of the sintered body, but a thickness of at least 2 µm is desired in view of formation of pinholes caused by deflection of a current density due to the unevenness of the surface of the sintered body at the time of electrolytic plating. When nickel is coated at a thickness of 10 µm, not only the filling density does not increase, but also the cost considerably rises.

The present invention will be illustrated in detail by the following examples.

EXAMPLE

An iron powder, or an iron and an iron oxide powder or iron hydroxide powder which differed in an average particle size were mixed at a given ratio. 500 parts by weight of the resulting iron mixed powder, 75 parts by weight (solid matter: 40 parts by weight and water: 60 parts by weight) of an acrylic adhesive and 120 parts by weight of a 2% CMC solution were introduced into a wet type dispersing machine and well kneaded to prepare a slurry. A foamed urethane sheet which was impregnated with the slurry and dried was heated to 450° C. in air to burn and remove the foamed urethane sheet and the adhesive, followed by heating to 1200° C. in a reducing gas stream containing hydrogen and keeping for 10 minutes to prepare a three-dimensional porous sintered body of iron. A nickel layer was formed on the whole surface of the sintered body having pores by electrolytic plating, and the sintered body was further subjected to a heat treatment at 600° C. for 5 minutes in a nitrogen stream to obtain a porous foamed substrate of two-layer structure as shown in FIG. 1. Tables 1–5 show conditions for making the substrate, such as the particle size of the ferrous powders, mixing ratio of the ferrous powders and thickness of the nickel plating layer and characteristics of the substrate. As a conventional sample, a foamed nickel substrate having a metal weight per unit of 600 g/m$^2$ obtained by coating an urethane sheet with carbon and subjecting the sheet to nickel electrolytic plating, removal of a solvent and a heat treatment in a reducing atmosphere was used.

The thickness of the resulting substrate having the above-mentioned construction was adjusted to 1.4 mm using a pair of columnar rollers having no unevenness on the surface thereof arranged above and below with providing a suitable space therebetween by passing the substrate through the space between the rollers revolved in a reverse direction to each other. Spherical nickel hydroxide particles having an average particle size of 10–20 µm as a main active material, and 10 parts by weight of cobalt hydroxide particles and 2 parts by weight of zinc oxide particles having an average particle size of 0.2 µm were kneaded to prepare a paste. With this paste was filled the above substrate and dried. The substrate was pressure molded to a thickness of 0.7 mm, followed by welding a lead to make a positive electrode plate. A negative electrode plate was made by coating a nickel plated punching metal steel sheet having a thickness of 0.06 mm with a paste prepared by kneading a known hydrogen-absorbing alloy powder with a binder, drying the coated sheet and pressure molding the sheet to a thickness of 0.4 mm. The resulting positive electrode plates and negative electrode plates and separators having a thickness of 0.15 mm and made of a sulfonated polypropylene interposed between the positive electrode plate and the negative electrode plate were wound to form a plate group. The plate group was inserted in a case together with an alkaline electrolyte and the case was sealed with a sealing plate provided with a safety valve to make a sealed nickel-hydrogen secondary battery of size A. The electrolyte was prepared by dissolving 40 g/l of LiOH.H$_2$O in an aqueous solution containing 25–40 parts by weight of potassium hydroxide. The discharge characteristics and cycle life characteristics of the sealed batteries at 25° C. and self discharge characteristics of the sealed batteries stored for 1 month at 45° C. are also shown in the tables.

TABLE 1

| | Substrate No. | 1 | 2 | 3 | 4 | Conventional Example |
|---|---|---|---|---|---|---|
| Production conditions | Urethane sheet average pore size (μm) | 500 | 700 | 300 | 200 | 500 |
| | Mixing ratio of powders (%) | 60 | 60 | 60 | 60 | — |
| | Powder of smaller than 15 μm (μm) | 10 | 10 | 10 | 10 | — |
| | Powder of 15 μm or larger (μm) | 40 | 40 | 40 | 40 | — |
| | Iron weight per unit (g/cm$^2$) | 400 | 400 | 400 | 400 | 500 (Ni) |
| | Thickness of Ni plating (μm) | 3.0 | 3.0 | 3.0 | 3.0 | — |
| Substrate characteristics | Metal weight per unit of substrate (g/m$^2$) | 510 | 508 | 520 | 530 | 505 |
| | Shrink of substrate (%) | 2.0 | 1.5 | 3.5 | 6.5 | 1.0 |
| | Pore size of substrate (μm) | 490 | 690 | 290 | 191 | 500 |
| | Matrix size of substrate (μm) | 55 | 76 | 30 | 16 | 50 |
| | Tensile strength (× 10$^{-6}$ Pa) | 3.9 | 4.0 | 2.9 | 0.4 | 3.6 |
| | Electric resistivity (Ωm/cm) | 4.3 | 3.7 | 6.2 | 12.5 | 39 |
| Battery characteristics | Utilization of active material (%) | 99.7 | 94.3 | 99.4 | 98.1 | 99.6 |
| | Average voltage at high rate discharge (V) | 1.117 | 1.062 | 1.115 | 1.105 | 1.116 |
| | Positive plate capacity density (mAh/cc) | 610 | 560 | 600 | 580 | 610 |
| | Cycle life characteristic (number) | 500 | 440 | 500 | 310 | 500 |
| | Storage characteristics (retention of capacity) | 72.3 | 74.6 | 70.3 | 61.2 | 72.2 |

The relation between the average pore diameter of the urethane sheet and the substrate characteristics will be explained using Table 1. When the metal weight per unit is the same, with decrease in the urethane pore size, the diameter of the matrix decreases. When the tensile breaking strength is lower than 1×10$^{-6}$ Pa, breaking is apt to occur in carrying of core materials in the course of production, and, further, holding of active materials decreases as for the battery characteristics, and the discharge characteristics deteriorate together with increase of the resistance of the substrate due to decrease in the sectional area of the matrix, resulting in deterioration in the life characteristics. On the other hand, if the pore size is large, the matrix size will be thick, but the contact area between the active material and the substrate will be reduced and the utilization of the active material present in the vicinity of the central portion of the pore will decrease and, thus, dropping of voltage will be great at the time of discharging of a greater current. Therefore, the pore size of the substrate is suitably 250–600 μm, more preferably 300–500 μm. The size of the matrix is secondarily determined from the results mentioned above and is preferably 20–100 μm, more preferably 30–60 μm.

The relation between the substrate characteristics and the content of the powder having an average particle size of smaller than 15 μm in the iron powder at the preparation of the sintered body will be explained with respect to Table 2. When the content is lower than 30%, it is difficult to density the sintered body, and the breaking strength lowers. When the content exceeds 80%, influence on shrinkage of the substrate is great. It is considered that if an oxide is present on the surface of the powder during sintering in a reducing atmosphere, a highly active iron is produced by the reduction, and the sinterability is improved to cause increase of tensile strength. Accordingly, it is more desirable to use iron oxide or iron hydroxide powder in a fine powder form.

TABLE 2

| | Substrate No. | 5 | 6 | 7 | 8 | 9 |
|---|---|---|---|---|---|---|
| Production conditions | Urethane sheet average pore size (μm) | 500 | 500 | 500 | 500 | 500 |
| | Mixing ratio of powders (%) | 80 | 90 | 30 | 20 | 60 |
| | Powder of smaller than 15 μm (μm) | 10 | 10 | 10 | 10 | 10 (Iron oxide) |
| | Powder of 15 μm or larger (μm) | 40 | 40 | 40 | 40 | 40 (Metallic iron) |
| | Iron weight per unit (g/cm$^2$) | 400 | 400 | 400 | 400 | 400 |
| | Thickness of Ni plating (mm) | 3.0 | 3.0 | 3.0 | 3.0 | 3.0 |
| Substrate characteristics | Metal weight per unit of substrate (g/m$^2$) | 515 | 545 | 510 | 505 | 505 |
| | Shrink of substrate (%) | 4.1 | 11.3 | 2.9 | 3.4 | 1.8 |
| | Pore size of substrate (μm) | 480 | 448 | 490 | 485 | 495 |
| | Matrix size of substrate (μm) | 64 | 97 | 49 | 43 | 58 |
| | Tensile strength (× 10$^{-6}$ Pa) | 3.6 | 3.1 | 2.9 | 0.8 | 4.9 |
| | Electric resistivity (Ωm/cm) | 4.6 | 3.3 | 5.2 | 8.7 | 4.0 |
| Battery characteristics | Utilization of active material (%) | 99.5 | 99.1 | 99.2 | 96.8 | 99.8 |
| | Average voltage at high rate discharge (V) | 1.116 | 1.116 | 1.115 | 1.095 | 1.117 |
| | Positive plate capacity density (mAh/cc) | 600 | 570 | 600 | 585 | 615 |
| | Cycle life characteristic (number) | 500 | 500 | 500 | 220 | 500 |
| | Storage characteristics (retention of capacity) | 71.4 | 72.1 | 72.2 | 70.5 | 72.9 |

TABLE 3

| | Substrate No. | 10 | 11 | 12 | 13 |
|---|---|---|---|---|---|
| Production conditions | Urethane sheet average pore size (μm) | 500 | 500 | 500 | 500 |
| | Mixing ratio of powders (%) | 60 | 60 | 60 | 60 |
| | Powder of smaller than 15 μm (μm) | 10 | 10 | 10 | 10 |
| | Powder of 15 μm or larger (μm) | 40 | 40 | 40 | 40 |
| | Iron weight per unit (g/cm$^2$) | 160 | 240 | 720 | 880 |
| | Thickness of Ni plating (μm) | 3.0 | 3.0 | 3.0 | 3.0 |
| Substrate characteristics | Metal weight per unit of substrate (g/m$^2$) | 220 | 310 | 920 | 1115 |
| | Shrink of substrate (%) | 9.0 | 3.0 | 1.7 | 1.3 |
| | Pore size of substrate (μm) | 455 | 485 | 495 | 495 |
| | Matrix size of substrate (μm) | 27 | 33 | 98 | 135 |
| | Tensile strength (× 10$^{-6}$ Pa) | 0.8 | 2.3 | 6.9 | 11.4 |
| | Electric resistivity (Ωm/cm) | 9.9 | 6.6 | 2.8 | 2.1 |
| Battery characteristics | Utilization of active material (%) | 91.8 | 93.8 | 99.0 | 99.5 |
| | Average voltage at high rate discharge (V) | 1.098 | 1.103 | 1.117 | 1.118 |
| | Positive plate capacity density (mAh/cc) | 550 | 570 | 540 | 485 |
| | Cycle life characteristic (number) | 190 | 500 | 500 | 500 |
| | Storage characteristics (retention of capacity) | 76.6 | 74.5 | 71.2 | 69.8 |

The relation between the metal weight per unit and the substrate characteristics will be explained using Table 3. When the metal weight per unit is small, the tensile strength tends to lower and the shrink tends to increase, and when the metal weight per unit is smaller than 200 g/m$^2$, the desired values of tensile strength and shrink cannot be satisfied. On the other hand, when the metal weight per unit is larger than 1000 g/m$^2$, the matrix size increases and the resistance of the substrate decreases, but since the volume of the substrate in the electrode plate increases, the fill amount of the active material decreases and the capacity density of the electrode plate decreases. Therefore, the metal weight per unit is suitably 250–1000 g/m$^2$, but more preferably 400–600 g/m$^2$ considering the balance of the resistance of the substrate, tensile strength and capacity density of the plate.

TABLE 4

| | Substrate No. | 14 | 15 | 16 |
|---|---|---|---|---|
| Production conditions | Urethane sheet average pore size (μm) | 500 | 500 | 500 |
| | Mixing ratio of powders (%) | 60 | 60 | 60 |
| | Powder of smaller than 15 μm (μm) | 25 | 10 | 10 |
| | Powder of 15 μm or larger (μm) | 40 | 10 | 110 |
| | Iron weight per unit (g/cm$^2$) | 400 | 400 | 400 |
| | Thickness of Ni plating (μm) | 3.0 | 3.0 | 3.0 |
| Substrate characteristics | Metal weight per unit of substrate (g/m$^2$) | 570 | 590 | 510 |
| | Shrink of substrate (%) | 12.7 | 16.8 | 1.9 |
| | Pore size of substrate (μm) | 440 | 420 | 490 |
| | Matrix size of substrate (μm) | 112 | 135 | 53 |
| | Tensile strength (× 10$^{-6}$ Pa) | 4.4 | 0.8 | 0.7 |
| | Electric resistivity (Ωm/cm) | 2.1 | 1.9 | 8.9 |
| Battery characteristics | Utilization of active material (%) | 98.9 | 99.0 | 98.5 |
| | Average voltage at high rate discharge (V) | 1.115 | 1.116 | 1.114 |
| | Positive plate capacity density (mAh/cc) | 570 | 575 | 580 |
| | Cycle life characteristic (number) | 500 | 360 | 320 |
| | Storage characteristics (retention of capacity) | 71.3 | 72.1 | 70.9 |

The relation between the particle size of the iron mixed powder used for sintering and the substrate characteristics will be explained with respect to Table 4. When the powder specified to be smaller than 15 μm in particle size is larger than a certain value or the powder specified to be 15 μm or larger in particle size is smaller, the shrink of the sintered body increases. Furthermore, when the particle size of the powder having the larger particle size exceeds 100 μm, the shrinkage is restrained, but the strength lowers. It is considered that these phenomena occur because when the ratio of the particle size of the respective powders deviates from a suitable range, the packing property of the powder decreases and, hence, sinterability deteriorates. In order to attain both the inhibition of shrinkage and the improvement of substrate strength, it is necessary that the average particle size of the powder be specified to be within the optimum range. Furthermore, batteries of low tensile strength of the substrate deteriorate in the cycle life characteristics, and it is considered that this is because the substrate cannot stand the expansion of active material caused by charging and discharging and the amount of the active material which falls off increases.

TABLE 5

| | Substrate No. | 17 | 18 | 19 | 20 |
|---|---|---|---|---|---|
| Production condi- | Urethane sheet average pore size (μm) | 500 | 500 | 500 | 50 |
| tion | Mixing ratio of powders (%) | 60 | 60 | 60 | 60 |
| | Powder of smaller than 15 μm (μm) | 10 | 10 | 10 | 10 |

TABLE 5-continued

|  | Substrate No. | 17 | 18 | 19 | 20 |
|---|---|---|---|---|---|
| tions | Powder of 15 μm or larger (μm) | 40 | 40 | 40 | 40 |
|  | Iron weight per unit (g/cm$^2$) | 400 | 400 | 400 | 400 |
|  | Thickness of Ni plating (μm) | 1.0 | 0.8 | 0 | 3.0 High temperature treatment |
| Substrate characteristics | Metal weight per unit of substrate (g/m$^2$) | 510 | 510 | 510 | 510 |
|  | Shrink of substrate (%) | 2.0 | 2.0 | 2.0 | 2.0 |
|  | Pore size of substrate (μm) | 490 | 490 | 490 | 490 |
|  | Matrix size of substrate (μm) | 55 | 55 | 55 | 55 |
|  | Tensile strength (× 10$^{-6}$ Pa) | 3.2 | 2.3 | 1.4 | 8.7 |
|  | Electric resistivity (Ωm/cm) | 5.7 | 7.8 | 11.8 | 24.9 |
| Battery characteristics | Utilization of active material (%) | 99.1 | 97.4 | 96.8 | 89.6 |
|  | Average voltage at high rate discharge (V) | 1.116 | 1.116 | 1.114 | 1.007 |
|  | Positive plate capacity density (mAh/cc) | 606 | 595 | 585 | 545 |
|  | Cycle life characteristic (number) | 500 | 260 | 160 | 115 |
|  | Storage characteristics (retention of capacity) | 70.3 | 42.1 | 23.9 | 50.7 |

The effect of the thickness of the nickel layer which covers the surface will be explained with respect to Table 5. When the thickness of the nickel plating layer is less than 1 μm, deterioration of the cycle life characteristics and self-discharge at storage are great. When the substrate is filled with the active material and rolled, the substrate is elongated, and when the thickness of the plating is insufficient, iron is exposed on the surface. The exposed iron is in a passive state and damages the electric conductivity of the surface to cause deterioration of the utilization. Furthermore, when iron and nickel coexist in the alkaline electrolyte, local cells are formed and, as a result, deterioration of the utilization and self-discharge characteristics is brought about due to decrease of the charging efficiency. As for the substrate No. 20, the heat treatment after the nickel plating was carried out at 900° C. In this case, it was confirmed that nearly the whole interface between the iron sintered body and the plating layer was alloyed, and it is considered that for this reason, the resistance of the substrate increases to deteriorate the battery characteristics. Accordingly, the heat treatment after the nickel plating is desirably carried out under the condition which leaves unalloyed portions at the interface.

A sealed alkaline storage battery was fabricated using the above-mentioned substrate No. 1. Explanation will be made on the conditions of designing of the battery based on the example. FIG. 1 shows the relation between the amount of the electrolyte and the cycle life characteristics. When the amount of the electrolyte is smaller than 1.3 cm$^3$ per 1 Ah of the positive plate theoretical capacity, the cycle life characteristics greatly deteriorate. Even if the substrate strength is at a sufficiently high level, the active material of the battery expands with repetition of the charging and discharging cycle to cause an uneven distribution of the electrolyte in the sealed battery. Furthermore, the iron slightly exposed from the substrate is corroded and is in a passive state. In this case, some electrolyte is also consumed. Therefore, the lower limit of the amount of the electrolyte must be 1.3 cm$^3$ per 1 Ah of the positive plate theoretical capacity according to the results of the example. When the amount of the electrolyte exceeds 2.8 cm$^3$, also the life characteristics deteriorate. This is because an excess electrolyte is present between the electrodes and gas absorbing reaction at the time of overcharging is hindered to take place and, as a result, any sealing of the battery cannot be maintained.

Figure 2:
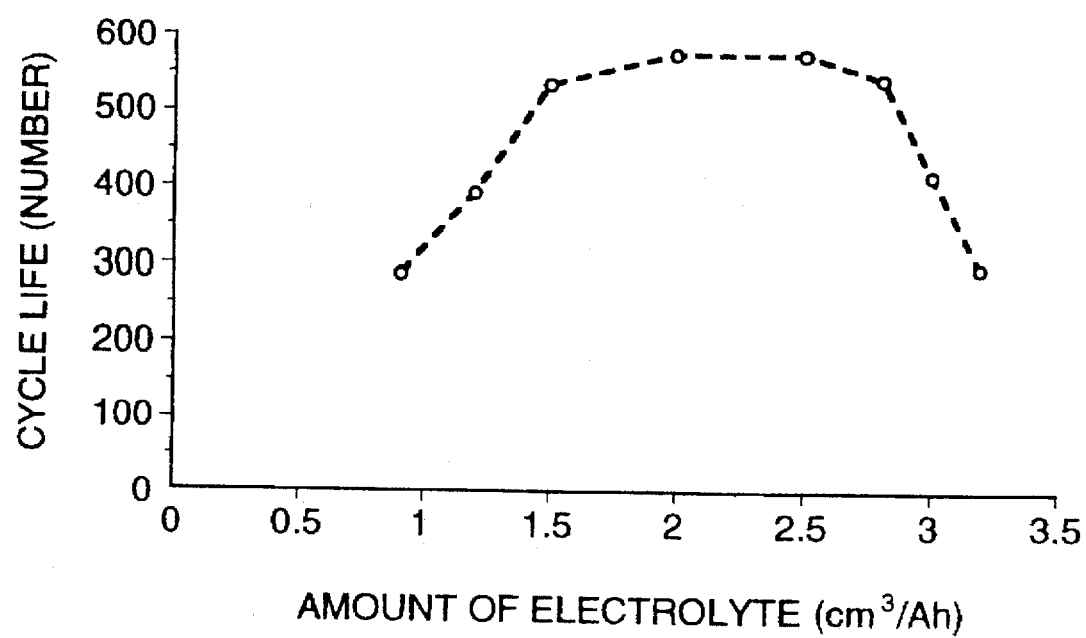
FIG. 2 is a graph which shows the relation between the amount of an electrolyte and the life characteristics for the theoretical capacity of a positive electrode.

FIG. 2 shows the relations between the concentration of the electrolyte mainly composed of potassium hydroxide, the average voltage at the time of high rate discharge of the battery, and the life characteristics. When the concentration of the electrolyte is lower than 25 parts by weight, the discharge voltage conspicuously lowers, and this is considered because the ionic conductivity decreases due to the low concentration of the electrolyte and a great polarization occurs. When the concentration of the electrolyte exceeds 40 parts by weight, the ionic conductivity also decreases and corrosiveness of the electrolyte increases. It is supposed that for this reason, the amount of iron which dissolves out from the substrate increases, resulting in deterioration of the life characteristics. When the thickness of the nickel plating layer is increased, the corrosion rate decreases, but increase in production cost is brought about.

Figure 3:
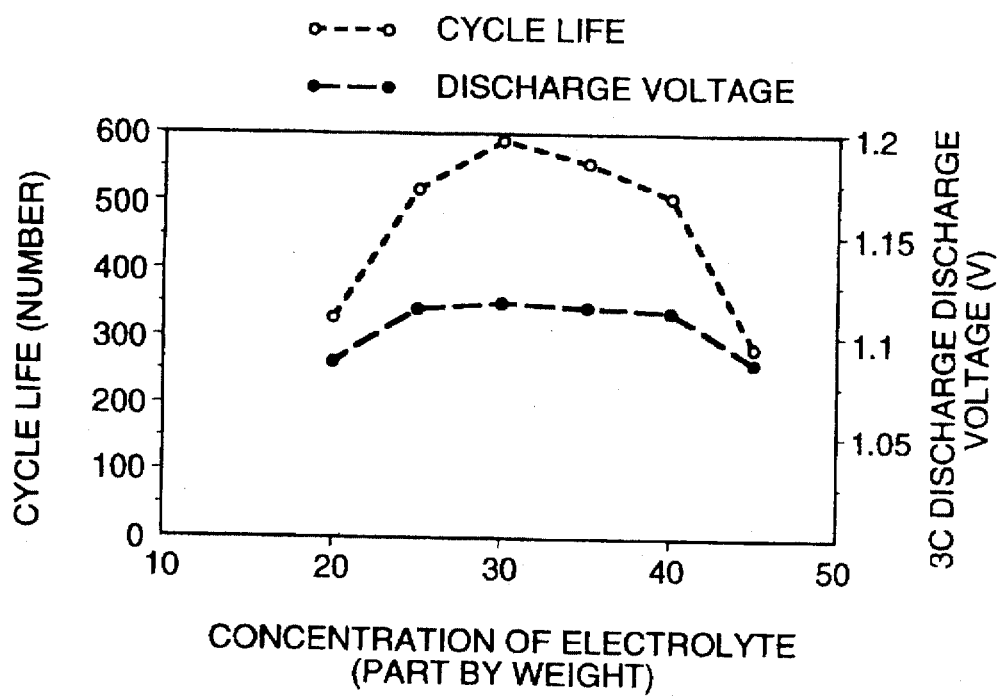
FIG. 3 is a graph which shows the relations between the concentration of an electrolyte and the life characteristics, and between the concentration of an electrolyte and the discharge characteristics.
Figure 4:
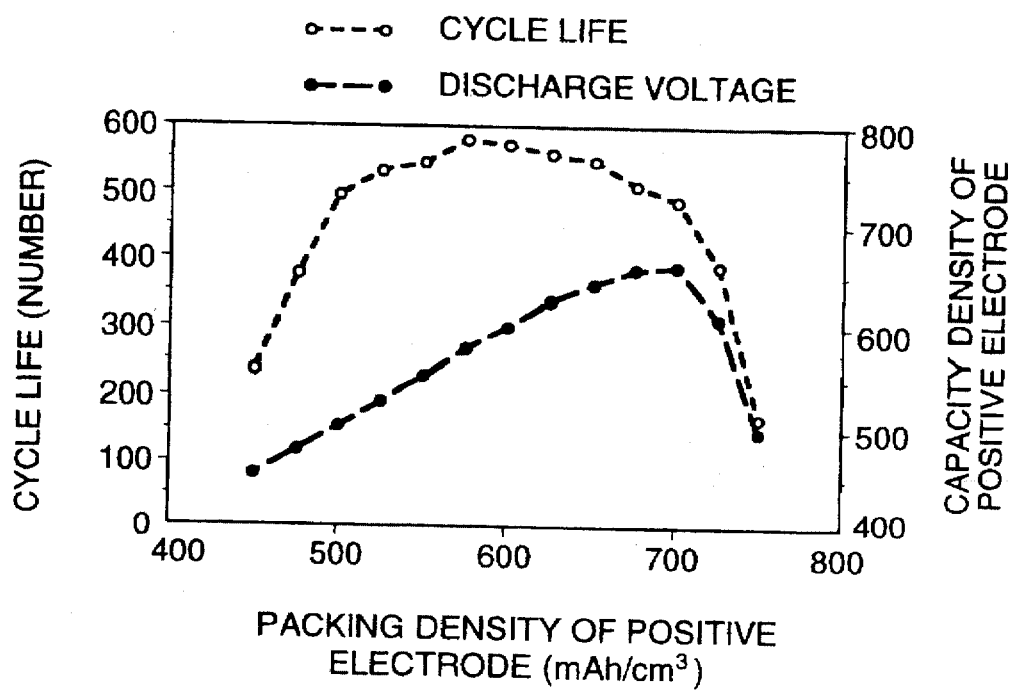
FIG. 4 is a graph which shows the relations between the packing density of positive electrode and the cycle life and between the packing density of a positive electrode and the capacity density of positive electrode.

Finally, the relations between the packing density of the positive plate, the life characteristics and the capacity density will be explained with respect to FIG. 3. When the capacity density of positive plate is lower than 500 mAh/cm$^3$, the life characteristics deteriorate. Thus, the when the packing density of the active material is low, the proportion of the substrate in the plate increases and, therefore, the proportion of the substrate matrix exposed on the surface of the substrate also increases. As a result of concentration of current onto the surface of the substrate superior in the electric conductivity to the active material, the amount of oxygen gas generated during charging increases to the accelerate the oxidative deterioration of the hydrogen-absorbing alloy of the negative plate, which causes deterioration of the life characteristics. On the other hand, when the packing density exceeds 700 mAh/cm$^3$, the capacity density abruptly lowers. This is considered because since the packed amount of active material in the substrate is excessive, the content of voids in the plate decrease and the utilization of the active material greatly decreases due to decrease in the amount of the electrolyte penetrated. Therefore, the capacity density of the positive plate of the alkaline storage battery of the present invention is suitably 500–700 mAh/cm$^3$, more preferably 550–650 mAh/cm$^3$.

As explained in detail hereinabove, according to the present invention, inexpensive iron can be used as the substrate of batteries in which an alkaline electrolyte is used and the amount of expensive nickel to be coated can be reduced and, in addition, the internal resistance can be restrained. Therefore, the present invention can provide alkaline storage batteries which are low in production cost, high in productivity and excellent in life characteristics and discharge characteristics.

What is claimed is:

1. An alkaline secondary battery comprising a sealed case which contains positive electrodes mainly composed of a nickel oxide, negative electrodes mainly composed of a hydrogen-absorbing alloy or cadmium oxide, an alkaline electrolyte containing at least one component selected from the group consisting of potassium hydroxide, lithium hydroxide and sodium hydroxide and separators, wherein a substrate used for at least one of the positive electrodes and the negative electrodes is a three-dimensional porous iron sintered body, which has an average pore diameter of 200–600 micrometers, and on the surface of which is provided a nickel coating layer, wherein the nickel coating layer was applied to the iron sintered body after the body was sintered, wherein at least a portion of an interface between the sintered body and the nickel coating layer is not alloyed.

2. An alkaline secondary battery according to claim 1, wherein the substrate has a tensile strength of $0.5 \times 10^{-6}$–$8.0 \times 10^{-6}$ Pa and an electric resistivity of 1.0–10.0 mΩ/cm.

3. An alkaline secondary battery according to claim 1, wherein the positive electrode has a capacity density of 500–700 mAh/cm$^3$.

4. An alkaline secondary battery according to claim 1, wherein the amount of the alkaline electrolyte is 1.3–2.8 cm$^3$ per 1 Ah of the theoretical capacity of the positive plate.

5. An alkaline secondary battery according to claim 1, wherein the concentration of the alkaline electrolyte is 25–40 parts by weight.

6. An alkaline secondary battery according to claim 1, wherein the substrate has a metal weight per unit of 250–1000 g/m$^2$ and a matrix diameter of 20–100 μm.

7. An alkaline secondary battery according to claim 1, wherein thickness of the nickel coating layer on the sintered body is 1–10 μm.

8. An alkaline secondary battery according to claim 1, wherein the substrate is made by coating the surface of the sintered body with nickel and, then, heat treating it in an inert gas atmosphere.

9. An alkaline secondary battery according to claim 1, wherein the interface between the sintered body and the nickel coated on the surface thereof is not alloyed.

10. The alkaline secondary battery according to claim 1, wherein the coating and the sintered body do not form an alloy at the interface.

* * * * *